July 28, 1936.  P. F. REICHERT  2,048,755
FLUSH TANK FLOAT
Filed Jan. 29, 1934
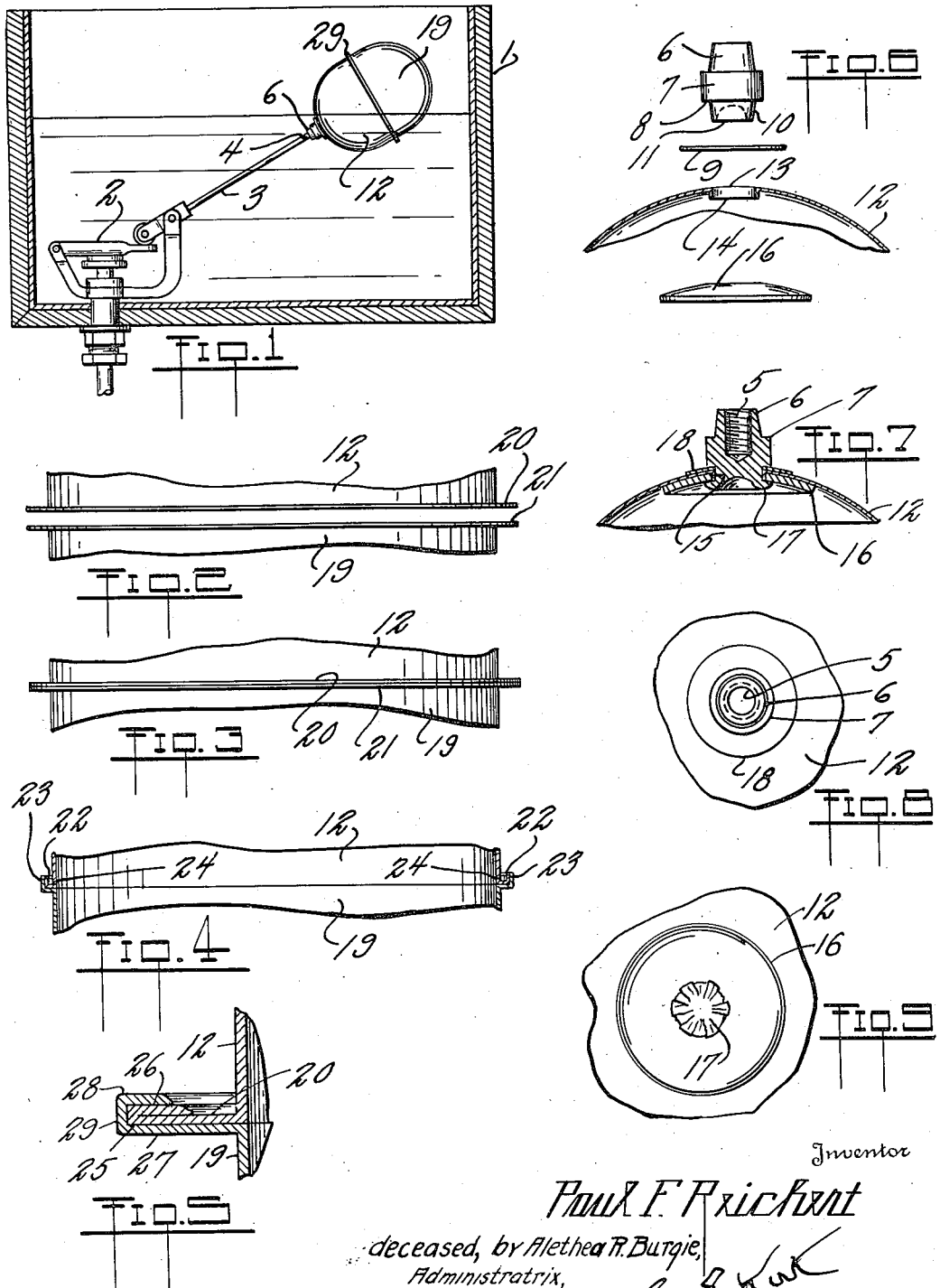
Inventor
Paul F. Reichert
deceased, by Alethea R. Burgie,
Administratrix,
By
Attorney Patented July 28, 1936

2,048,755

UNITED STATES PATENT OFFICE 2,048,755

FLUSH TANK FLOAT

Paul F. Reichert, deceased, late a resident of Toledo, Ohio, by Alethea R. Burgie, administratrix, Toledo, Ohio, assignor to The Reichert Float & Manufacturing Company, Toledo, Ohio, a corporation of Ohio Application January 29, 1934, Serial No. 708,841

1 Claim. (Cl. 137—104)

This invention relates to mounting and sealing receptacles.

This invention has utility when incorporated in floats, especially of the sheet metal type as adapted for automatic valve control in flush tanks for toilets.

Referring to the drawing:

Fig. 1 is a section through a flush tank, showing the automatic valve with an embodiment of the invention therein as the float;

Fig. 2 is a fragmentary view of the pair of float sections as flanged at the enlarged portion;

Fig. 3 is a view similar to Fig. 2 with the flanges brought into abutting relation;

Fig. 4 is a section at the flanges of Fig. 3, showing the flanges offset or cupped in a common direction, the metal being shown of greater thickness relatively than in practice;

Fig. 5 is an enlarged detail view in section, of the joint;

Fig. 6 is a distributed view of the spud mounting and a fragment of the section;

Fig. 7 is a section through the spud of Fig. 6, in assembled position for mounting the float;

Fig. 8 is a fragmentary view looking into the spud from the outside of the float; and Fig. 9 is a fragmentary view looking at the spud from the inside of the float.

Flush tank 1 is shown as having automatic valve 2, with operating lever 3 therefrom. This lever 3 has externally threaded terminus 4 to receive internally threaded portion 5 of fitting or spud 6. This spud 6 has enlargement 7 providing shoulder 8 against which is placed flat, outer washer 9 with extension 10 from the spud 6 protruding through this washer 9. This extension 10 has terminally concave portion 11. Sheet metal shell section 12 of the float is shown with opening 13 surrounded with inwardly projecting flange 14 providing a throat. This extension 10 protrudes through said throat and opening 15 in concavo convex washer 16. The flange 14 provides a centering means for this washer 16 with the shell or section 12. This shell or section 12 is of thin copper and is effective as a gasket at this spud mounting, which gasket is sealed in the assembly, for as the extension 10 protrudes through the washer 16, pressure action is brought to bear in spreading the extension 10 from its concave terminus 11, so that the rim of such terminus is deformed into flange 17 as a rivet assembly; while simultaneously, the washer 9 has been dished to conform to the convex outer contour of the shell 12; and in this assembly, the washer 9 is now outer concavo-convex brass washer 18 opposing the major stiffer metal, as iron, washer 13. There is thus formed a reinforced tight assembly for this spud with the section 12 to provide a sealed mounting for this receptacle or float.

Companion shell or section 19 may be brought into opposing relation at the enlarged portion with the section 12, where these sections have respectively, outwardly extending flanges 20, 21. These flanges are brought into abutting relation with the sections in register (Fig. 3), and then said flanges are cupped to have the outer rim of the flange 20 for an inner turned-back portion 22 nesting within turned back portion 23 of the section 19.

These two flanges, as terminally offset in a common direction, provide inside the offset 22 a clearance region 24 toward the section 12. The final operation in this assembly at the joint between the sections is effected by a turn-over and effective pressing, merged on a riveting operation, due to the malleable character of this stock which in practice may run .008 to .025 of an inch in thickness.

This pressing operation results in the flange from the section 12 having outwardly extending portion 25 and bent back thereon inwardly extending portion 26 having its inward terminus flattened or battered into a rivet form against the portion 25. About this relatively thin rib from the section 19, the flange has outwardly extending portion 27 lying against one side of the rib 25, 26, and return bend portion 28 against the opposite side lying against the portion 26. There is accordingly provided herein a gasketless, self-sealing joint in the form of this double ply or folded twin flange or rib.

The extension of the flat surfaces on the opposing sides of this rib joint 29, continuously throughout the annular extent, are subjected simultaneously to a rivet-like effecting pressure, which produces a sealing effect against air leakage from or water entrance into the float. This joint is accordingly one of simplified character, substantial in reinforcing the float at its major or weaker portion and insuring tightness and sealing of the sections in and of themselves, thereby avoiding disturbances from temperature change and varying expansion disturbances that would arise between dissimilar materials.

The anchoring of the brass spud is a simple assembly operation, likewise avoiding elements which might tend to disintegrate or detract from permanence as exposed to the liquids in which the float is to be operable.

What is claimed and it is desired to secure by United States Letters Patent is:

A sheet metal float comprising a section having a concave wall provided with an inwardly extending peripherally-flanged opening therethrough, a float-mounting spud having a tubular internally-threaded portion terminating in an annular shoulder, there being a terminally-concave extension for the spud on the opposite side of the shoulder from the tubular portion, an outer washer snugly fitting about the extension and abutting the shoulder, said extension protruding through said float wall opening, said outer washer nesting with a portion of said metal float section, and a load strain distributing and float wall stiffening normally concavo-convex inner washer on said extension, said inner washer on its convex side nesting in said concave wall as a seat with a portion of said section between said outer and inner washers to provide a reinforced region about said spud, said inner washer being of greater diametrical extent than said outer washer, said spud extension having its margin forming a rim deformed to engage the concave side of the inner washer to lock the spud and inner and outer washers into sealed assembly with the float and to clamp said washers into float-embracing relation throughout their extent and the outer washer against said shoulder, said rim approximating the extent of and in parallelism with said shoulder.

ALETHEA R. BURGIE,
*Administratrix of the Estate of Paul F. Reichert, Deceased.*